United States Patent

[11] 3,543,988

[72] Inventor Frederick W. Kulicke, Jr.
Philadelphia, Pennsylvania
[21] Appl. No. 798,977
[22] Filed Feb. 13, 1969
[45] Patented Dec. 1, 1970
[73] Assignee Kulicke and Soffa Industries, Inc.
a corporation of Delaware

[54] APPARATUS FOR CONTROLLING THE MOTION OF A WIRE BONDING TOOL
10 Claims, 9 Drawing Figs.

[52] U.S. Cl. ........ 228/3;
29/470.1; 228/1, 228/7, 228/13, 228/44
[51] Int. Cl. ........ B23k 21/00
[50] Field of Search ........ 228/3, 4, 6,
7, 1, 13, 44; 29/470.1

[56] References Cited
UNITED STATES PATENTS

| | | | |
|---|---|---|---|
| 3,313,464 | 4/1967 | Avedissian | 228/3 |
| 3,342,395 | 9/1967 | Diepeveen | 228/3X |
| 3,305,157 | 2/1967 | Pennings | 228/3 |

*Primary Examiner*—John F. Campbell
*Assistant Examiner*—Robert J. Craig
*Attorney*—John B. Sowell

ABSTRACT: An apparatus for moving and positioning a bonding tool between bonding positions along a predetermined path including manually adjustable means for changing the height and shape of a wire loop pattern between bonds.

INVENTOR.
Frederick W. Kulicke, Jr.
BY John B. Sowell
ATTORNEY.

INVENTOR.
Frederick W. Kulicke, Jr.
BY
John B. Sowell
ATTORNEY.

INVENTOR.
Frederick W. Kulicke, Jr.
BY
John B. Sowell
ATTORNEY.

INVENTOR.
Frederick W. Kulicke, Jr.
BY
John B Sowell
ATTORNEY.

APPARATUS FOR CONTROLLING THE MOTION OF A WIRE BONDING TOOL

BACKGROUND OF THE INVENTION

The present invention constitutes an improvement in semiconductor wire bonding apparatus. In the process of making transistors and unitary semiconductor devices it is common practice to bond a fine wire to an electrode of the semiconductor device and then manually move the device relative to the bonding tool to play out a length of wire. The free end of the wire is then bonded to another electrode, or more commonly to a post or pad, to complete an electrical circuit. Since the introduction of integrated circuits, semiconductor devices have been made smaller and a plurality of active devices have been placed on a single carrier or chip. The distance between average connection points on such devices varies from several to one hundred fifty thousandths of an inch, and the difference in elevation between average connection points on such devices may vary from zero to as much as one-eighth of an inch. In a single integrated circuit both distances could vary even though it is better production practice to maintain at least the difference in elevation between bonding points as constant as is possible.

Heretofore, it was common practice to employ wire bonding machines in which the control of the bonding tool was completely manual, thus, permitting a wide tolerance of vertical and horizontal movement movement of the bonding tool, however, manual wire bonders are expensive to operate and introduce human errors and inconsistent results.

Heretofore, automatic wire bonders have been made, however, such machines were designed for devices having very large electrodes or pads to which the wires are bonded. There was no way to adjust the pattern of the loop or to adjust for the difference in height and distance between connection points once the machine was set in operation.

Wire bonding machines have been made which will make bonds with or without automatically severing the connection wire. These machines have permitted fast location and orientation of the bonding tool over the electrode or pad, and have further provided means for automatically bonding the wire to an electrode or pad, however, such machines have not been provided with means for automatically making a predetermined and adjustable loop, nor have they been provided with means for interrupting a sequence of operations to manually control the position of the bonding tool.

BRIEF SUMMARY OF THE INVENTION

The present invention overcomes the limitations in the prior art wire bonding machines by providing an apparatus which positions the bonding tool at a predetermined adjustable height over the target on a semiconductor device and after making a first bond automatically moves the bonding tool simultaneously upwardly and rearwardly defining a predetermined and adjustable loop in the wire. The apparatus, though arranged for sequencing through a plurality of predetermined steps, may be interrupted and placed in a manual mode of operation and subsequently returned to the semiautomatic or automatic mode to complete the last bond.

The principal object of the present invention is to provide in a semiconductor wire bonding machine a novel apparatus for adjusting both the height and length of a loop to be automatically placed in a wire after a first bond.

Another primary object of the present invention is to provide in a semiconductor bonding machine a novel apparatus for either manually or automatically adjusting the height of the bonding tool at different steps of operation. A further object of the present invention is to provide in a semiconductor bonding machine a novel apparatus including rapidly interchangeable cam plates for accurately predetermining the distance the bonding tool is moved rearwardly after a first bond.

Accordingly, there is provided a plurality of cams for determining the height of the bonding tool, each cam having a cam follower adapted at to actuate a single master drop arm connected to support the free end of the pivoted bonding tool holder. The cams and followers are arranged so that the cam follower programed to drop the bonding tool to the lowest level engages the master drop arm to position the bonding tool, however, some of the cam followers are pivoted on eccentrically mounted bushings which are rotatable by hand-Z means. The rotation of the bushings causes the levers formerly under control of cams to engage the master control arm whereby the hand-Z lever is effective to control the height of the bonding tool.

DETAILED DESCRIPTION OF THE PREFERRED EMBODIMENT

Figure 1:
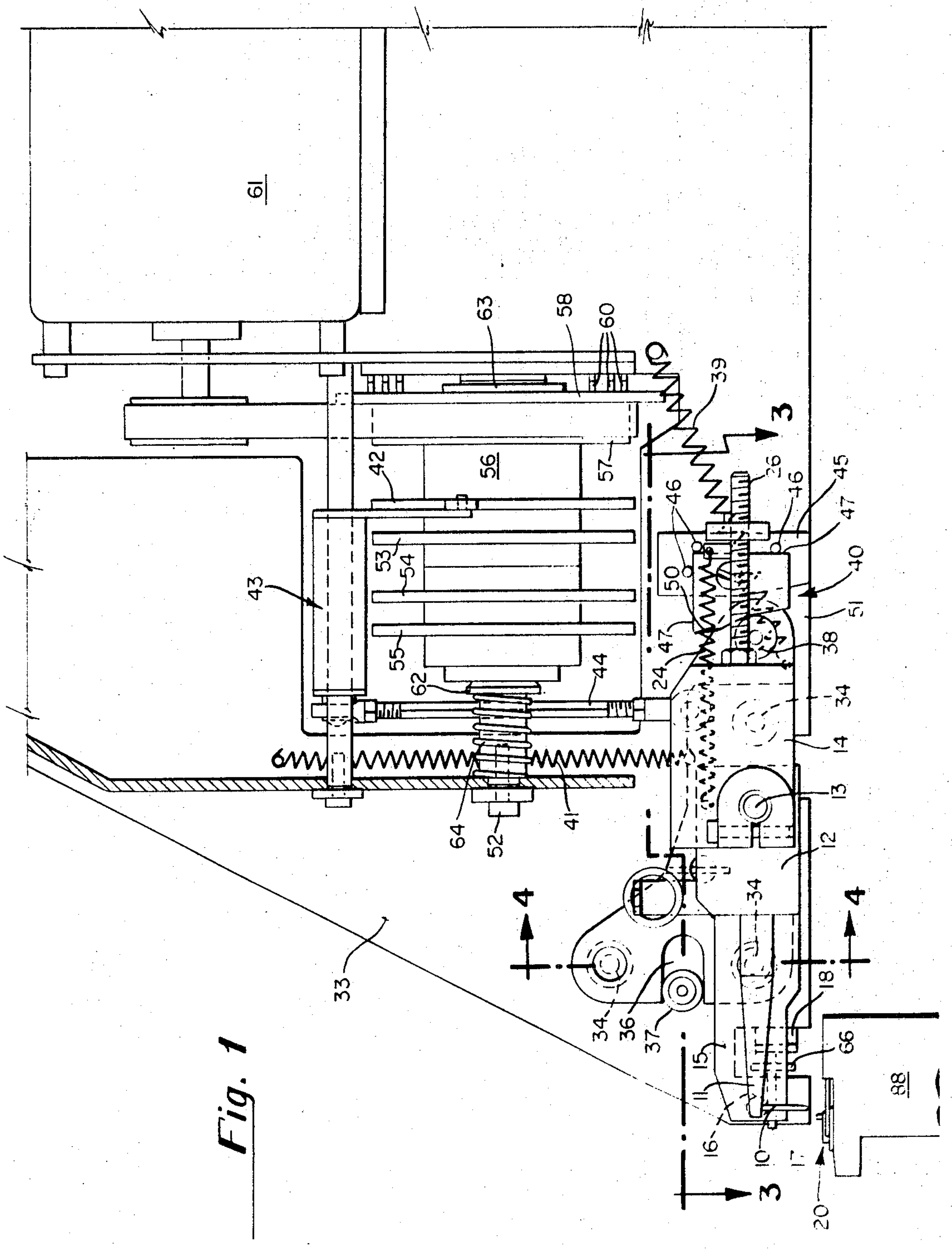
FIG. 1 is a left side elevation of the apparatus for positioning a bonding tool.
Figure 2:
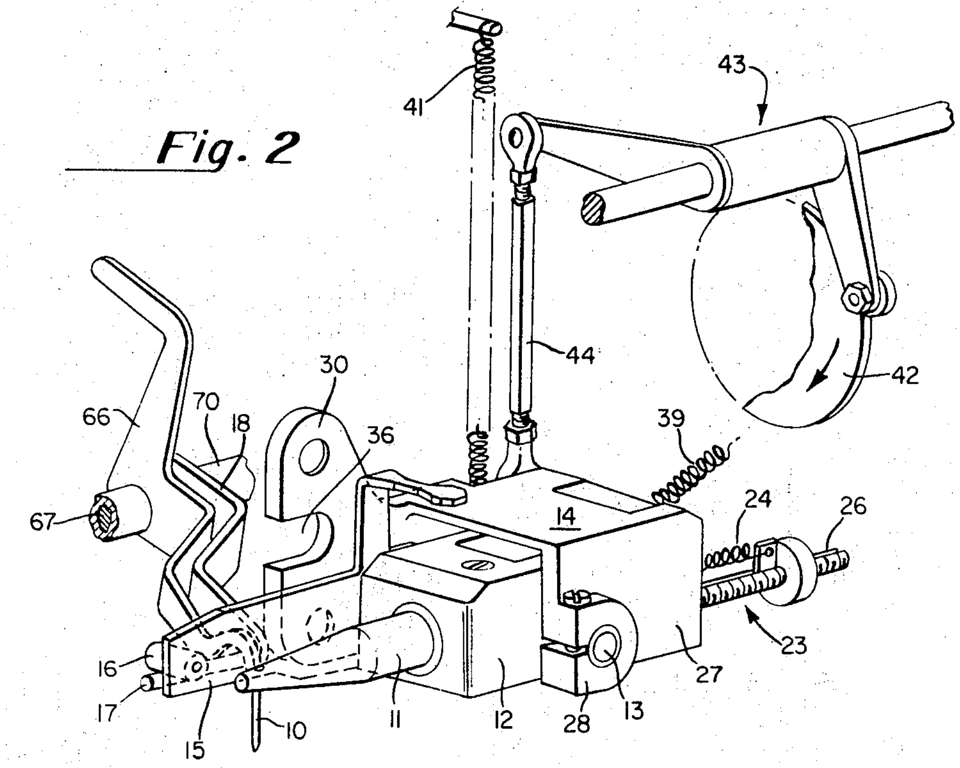
FIG. 2 is a left front perspective view of the bonding tool holder and carrier assembly and the drive mechanism therefor.
Figures 3, 4:
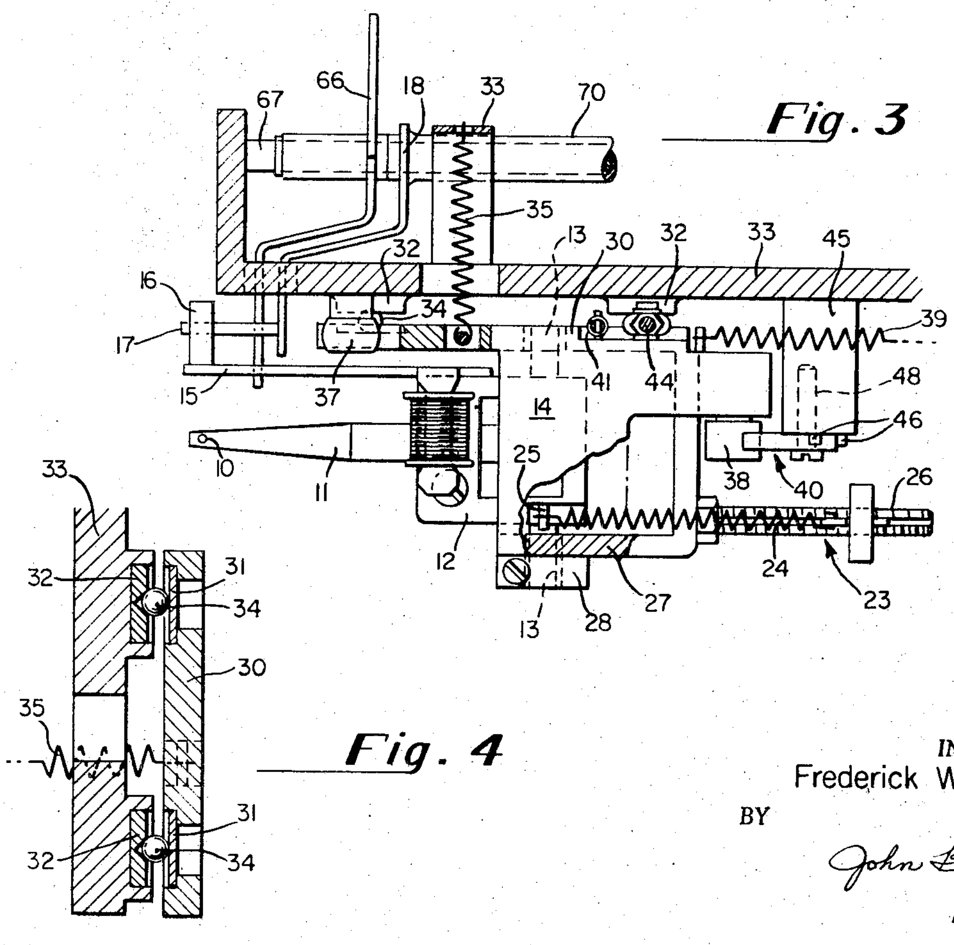
FIG. 3 is a plan view of the bonding tool holder and carrier assembly shown mounted on the frame taken at lines 3–3 of FIG. 1.
FIG. 4 is an enlarged detail in elevation of the bearing for slidably mounting the carrier assembly to the frame taken at lines 4–of FIG. 1.

As shown in FIGS. 1 to 3, bonding tool 10 is mounted in an ultrasonic transducer or bonding tool holder 11, which further includes a transducer block assembly 12 pivotally mounted at pivots 13 on a transducer carrier assembly 14. A sprint plate 15 is connected to the block assembly 12 and extends forwardly parallel to the free end of the bonding tool holder 11 terminating in an actuator follower 16 alined with the end of the bonding tool 10. A support actuator 17 connected to the support actuator arm 18 extends beneath the actuator follower 16 and is effective to determine the height to which the bonding tool 10 is raised above the semiconductor device 20. When the support actuator 17 is moved down a distance sufficient to disengage the actuator follower 16, the bonding tool 10 is free to engage a fine wire upon an electrode 21 or post 22 on the semiconductor device 20. The force exerted by the bonding tool 10 on the fine wire is adjustable from zero to a few hundred grams by tension adjustment means 23, which comprises a counterbalance spring 24 having one end connected to a projection 25 on holder 11 and the other end connected to an adjustable spring tensioning device 26 on carrier assembly 14.

The pivot end of holder 11 may be moved by carrier assembly 14 independent of the height of the bonding tool at the free end. Carrier assembly 14 is U-shaped, having a leg 27 which supports one pivot 13 in a dutch key 28 and a leg 30 which supports the other pivot 13. Leg 30 is provided with three bearing plates 31 located juxtaposed three bearing plates 32 on frame 33. Bearing plates 31, 32 define two parallel planes which are separated by antifriction balls 34, and are maintained in their respective parallel planes by tension spring 35 interconnecting leg 30 and frame 33.

A slot 36 in the forwardmost end of a leg 30 embraces a carrier pivot bearing 37 fixed on frame 33, thus, restricting the forward most end of carrier assembly 14 to substantially horizontal movement relative to frame 33. Cam follower 38 on the rear of carrier assembly 14 is forced into engagement with stepeback cam 40 by retract spring 41. The vertical position of follower 38 relative to cam 40 is determined by retract cam 42 acting through bell crank 43 and link 44 connecting carrier assembly 14 and bell crank 43. Tension spring 41, connected between frame 33 and assembly 14, serves to eliminate any backlash or slack between the cam and linkage system. As cam follower 38 is moved vertically, it follows the contour of step-back cam 40 imparting substantially horizontal movement to slot 36 in carrier 14, and both horizontal and vertical movement to pivots 13. Vertical movement of pivots 13 tilts the working face of the bonding tool and horizontal movement of the pivots 13 moves the bonding tool in the direction of movement of the pivots. In the preferred embodiment shown, no adjustment has been provided for changing the amount of vertical motion imparted to the carrier 14 by retract cam 42, however, this could be accomplished by adjusting the length of one of the arms of bell crank 43 or changing cam 42. The amount of horizontal motion imparted to carrier 14 is determined by step-back cam 40 which is removably mounted on support block 45, a portion of frame 33. Three locator pins 46 on support block 45 engage mounting edges 47 for accurate positioning of step-back cam 40. Removable mounting means, such as a screw 48, holds cam 40 in place and permits easy replacement. This feature of the present invention allows the amount of step-back or rearward motion between the first and last bond to be easily changed to coincide with the distance between electrodes or pads on a semiconductor device. Step-back cams 40 of the preferred embodiment are designed to move the bonding tool rearward or forward up to one hundred and fifty one-thousandths of an inch. Upper face 50 of cam 40 is engaged by cam follower 38 at the first bond and preferably imparts approximately four degrees toe to bonding tool 10. Intermediate face 51 of cam 40 is engaged by cam follower 38 at the last bond and during stitch bonding, and preferably imparts no degree of heel or toe to the working face of bonding tool 10.

Figures 5, 6:
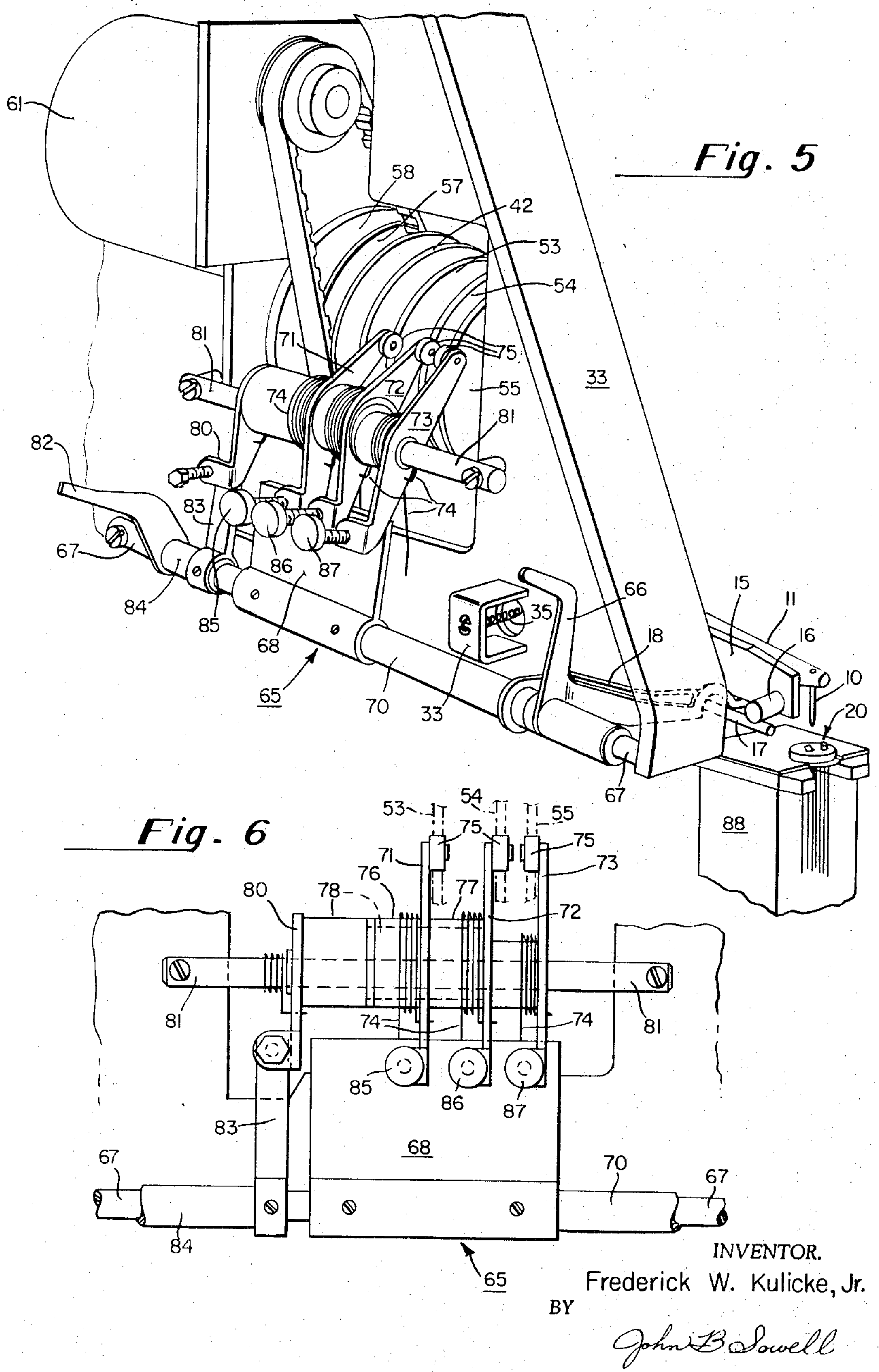
FIG 5 is a right front perspective view of the apparatus showing the master drop arm and drive mechanism therefor.
FIG. 6 is a side elevation of the height control cam followers and the drop arm paddle.

As best shown in FIGS. 1 and 5, retract cam 42 is rotatably mounted on a common fixed shaft 52 along with second search cam 53, first search cam 54 and loop cam 55 as a cam bank assembly 56. Interlocked and rotatably with cam bank assembly 56 are drive gear 57 and printed circuit disk 58. Brushes 60 engage the printed circuit pattern and are connected to logical electrical circuitry and operator controlled bonding and stepping switches (not shown) which are effective to cause the drive motor 61 to rotate the cam bank to a plurality of predetermined positions, as will be explained hereinafter. Rotary switches and logical circuitry are well known and are not considered to be a part of the present invention. For ease of manufacture and/or adaptability to extreme cases, any part or all of the cam bank assembly may be readily replaced by removing shaft 52 and thrust bearings 62 and 63 urged into engagement with the ends of the cam bank by spring 64.

When the master drop arm 65 is rotated clockwise, as best seen in FIGS. 3 and 5, support actuator 17 on arm 18 is lowered permitting actuator follower 16 to lower bonding tool 10. Except for manual lifter arm 66, independently mounted on drop arm shaft 67, and engageable with sprint plate 15, all raising or lowering of the bonding tool is controlled through drop arm 65 and actuator arm 18 affixed thereto. Drop arm paddle 68, fixed through sleeve 70 to arm 18, extends under the three height cam followers so that the follower having the maximum counterclockwise movement is effective to engage paddle 68 and lower the bonding tool. Second search cam follower 71, first search cam follower 72 and loop cam follower 73 are biased by springs 74 to normally engage their respective cams 53, 54 and 55. Followers 71 and 72 are connected to sleeves 76 and 77 respectively, which are conventionally mounted on a stepped bushing 78. The bushing 78 extends beyond sleeves 76 and 77 and is connected to a lever arm 80 for rotation therewith. Bushing 78 is eccentrically mounted on shaft 81 so that rotation of the bushing 78 by arm 80 effectively moves the lower ends of height cam followers 72 and 73 counterclockwise; this results in clockwise movement of master drop arm 65 and lowering of bonding tool 10. A hand-Z lever 82, fixed to lever 83 by sleeve 84, is rotatably mounted on shaft 67 and when moved down, as seen in FIG. 5, causes lever 83 to engage arm 80 resulting in lowering of bonding tool 10.

As shown in FIGS. 5 and 6, the upper ends of the height cam followers 71, 72, 73 are provided with rollers 75 and the lower ends are provided with adjustment screws 85, 86, 87 for adjusting the height of the bonding tool.

Figure 9:
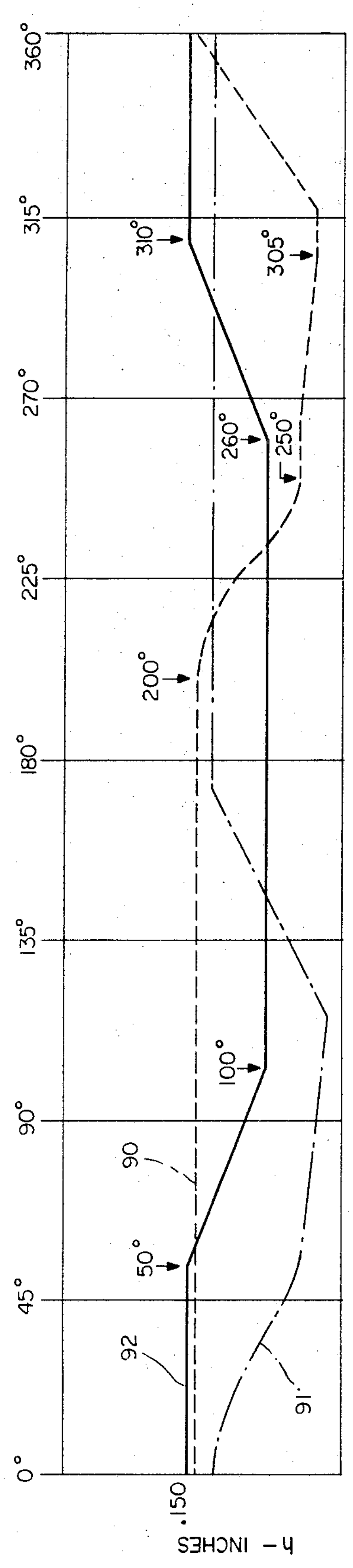
FIG. 9 is a cam diagram for the height control cams.
Figure 7:
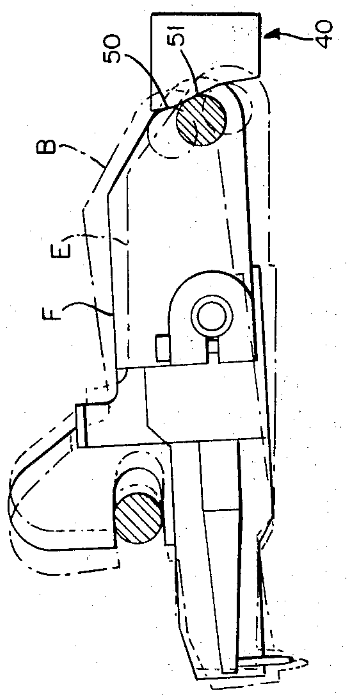
FIG. 7 is a side elevation of the bonding tool holder and carrier assembly showing three distinct positions of the bonding tool.
Figure 8:
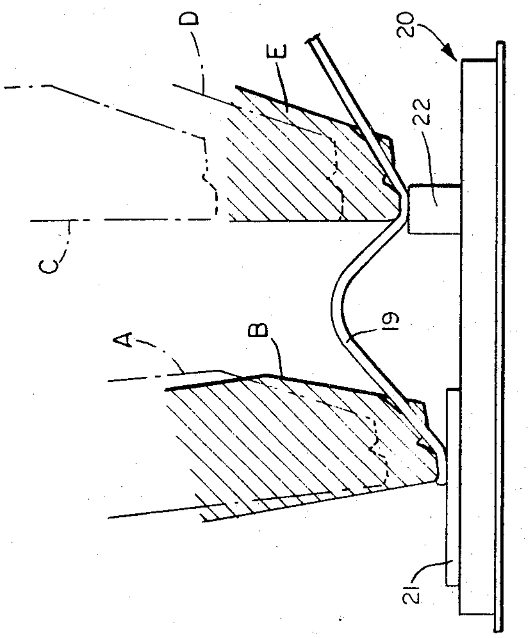
FIG. 8 is a side elevation of the bonding tool showing five distinct positions of the bonding tool.

Referring now to FIGS. 7 to 9, the control of the height of the bonding tool may be explained with reference to a typical operation. A fine wire 19 is to be connected from the electrode on chip 21 to the post 22 of semiconductor device 20. The device 20 is positioned below bonding tool 10 by workholder 88 movable on a friction plate or through a micromanipulator (not shown). The cam bank assembly 56 starts its operation at 0° in a machine cycle and completes the sequence of operations in 360° or one revolution of the cam bank assembly 56.

FIG. 9 shows schematically height *h* of the bonding tool 10 versus degree of rotation of the respective height control cam. Since high portions on the height control cams tend to lower the bonding tool, the curves may considered to be inverted cam profiles. Cam curves 90, 91, 92 represent the inverted profiles of second search cam 53, first search cam 54 and loop cam 55. It will be understood that the change in setting of the adjustment screws 85, 86, 87 is effective to raise or lower respective cam curves 90, 91, 92.

Starting at 0° or reset position, the bonding tool is under the control of first search cam curve 91 (i.e. cam 54) where the tool is approximately one hundred and thirty thousandths of an inch above electrode 21. Drive motor 61 is stepped 50° stopping the tool a few thousandths of an inch above the electrode at first search position A. Drive motor 61 is next stepped to about 100° to first bond position B. It will be noted in FIG. 7 that the retract cam 42 has raised the carrier assembly 14 to a high or first bond position B, causing the working face of the bonding tool to be tilted forward or in the toe direction approximately 4°. Drive motor 61 is stepped again stopping at approximately 200°. First search cam curve 91, after the first bond (position B), attempts to raise the bonding tool, however, loop cam curve 92 at approximately 145° crosses curve 91, thus, overriding its control and maintaining the loop height set by loop cam 55 (cam curve 92). At the loop position C, carrier assembly 14 was moved both rearwardly and downwardly, placing the bonding tool substantially on a vertical axis and the working face of the bonding tool horizontal. Drive motor 61 is stepped again to stop at about 250°, or at second search position D. Loop cam curve 92 is crossed over by second bond cam curve 90 and takes control at approximately 235°. When drive motor 61 is stepped again, it stops at about 305° in second bond position E. In positions C, D and E the bonding tool is in its rearmost position, and the position of the carrier assembly 14 is approximately the same as the second bond position E, shown in FIG. 7. When drive motor 61 is stepped again, the cam bank assembly 56 is returned to the zero or reset position where the height of the bonding tool is again determined by first search cam curve 91 (cam 54).

Although the operation of the preferred embodiment has been explained with regard to each of the six above steps, it is to be understood that the machine function does not require that the drive motor stops at the reset or the loop positions.

When bonding wires to integrated circuits, ti is it is often desirable to bond the same wire to more than two targets or electrodes. The process of bonding the same wire to more than two targets is referred to as stitch bonding. In the above sequence of steps the drive motor 61 is stopped in second search position D. Bonding tool 10 is then manipulated down to a bond position E by manual operation of the hand-Z lever 82. If additional height control is required between bonds, adjustment screw 85 controlling the second bond search height may be changed. After a first stitch bond is made manually the semiconductor device 20 may be moved to any desired position and a second stitch bond made. When the last bond is to be made, it is preferred that the tool be positioned over the target at normal search height and the remaining semiautomatic steps completed. Although not a part of this invention, the last or second bond is usually accompanied by automatically breaking off the fine wire, leaving the bonded tool threaded and in position for another first bond.

Having explained the preferred embodiment of the invention, it is apparent that the wire bonding apparatus could be employed in various types of bonding machines. While it is preferred that the working face of the bonding tool be parallel to the workpiece at second bond and have approximately 4° toe at first bond for optimum strength bonds, other angles have been known to produce acceptable bonds. The bonding apparatus of the present invention permits wire bonding on a widely diversified group of semiconductor devices in a semiautomatic mode of operation. Also the apparatus permits the operator to adjust accurately the loop between bonds which are duplicated by the semiautomatic apparatus. Further, the operator may select the distance the apparatus steps back or moves after the first bond so as to eliminate any need in searching for the second bond target. When bonding complex integrated circuit devices, the semiautomatic mode of operation may be discontinued and the apparatus operated in a fully manual mode.

I claim:

1. An apparatus for moving and positioning a bonding tool relative to a semiconductor device comprising:

- a support frame;
- a carrier assembly slidably guided on said frame;
- a bonding tool holder pivotally mounted on said carrier assembly;
- a bonding tool mounted in the free end of the bonding tool holder;
- a master drip arm having a support actuator arm engageable with the free end of said bonding tool holder to position the height of the bonding tool;
- a drop arm paddle on the drop arm for moving the support actuator arm;
- a plurality of height control cams adapted to be rotationally positioned by a drive motor; and
- a plurality of height cam followers, one for each height control cam engageable with said height control cams to sequentially engage said drop arm paddle to position the height of the bonding tool by moving the support actuator arm.

2. An apparatus as set forth in claim 1, wherein each said height cam follower includes means for manually adjusting the distance from one end of said follower to said drop arm paddle for changing the height to which the bonding tool is positioned above the semiconductor device by said height control cams.

3. An apparatus as set forth in claim 2, wherein some of said height control cam followers comprise lever arms pivotally mounted intermediate their ends on eccentrically mounted bushings, said bushings being rotatable eccentrically on a shaft by hand-Z means, whereby the rotation of the bushings by said hand-Z means is effective to move and engage at least one of the height cam followers with the drop arm paddle causing the hand-Z means to override the position of the master drop arm and effectively control the height of the bonding tool.

4. An apparatus as set forth in claim 3, wherein at least two height control cam followers are pivotally mounted on bushings which are eccentrically mounted on a common shaft, one of said followers being manually adjustable to predetermine the search height at the first bond and the other of said two followers being manually adjustable to predetermine the search height at the last bond.

5. An apparatus as set forth in claim 4, wherein at least another one of said height control cam followers is pivotally mounted on a bushing which is concentric to said common shaft, said another one of said followers being manually adjustable to predetermine the loop height between the first and last bond.

6. An apparatus as set forth in claim 2, wherein said means for manually adjusting the distance from one end of said follower to said drop arm paddle comprises a set screw threaded through a tab on the end of the height cam follower.

7. An apparatus as set forth in claim 1, which further includes a retract cam, retract cam follower means connecting said retract cam to said carrier assembly for raising and lowering the pivoted end of the bonding tool holder, a step-back cam on said frame, a step-back cam follower on said carrier assembly engaging said step-back cam for slidably moving the carrier assembly forwardly or rearwardly, said retract cam being driven simultaneously with said height control cams whereby the working face of the bonding tool is positioned for a first bond, moved rearwardly and upwardly in a predetermined and adjustable loop pattern, and positioned for the last bond.

8. An apparatus as set forth in claim 7, wherein said step-back cam comprises a plate having two mounting edges normal to each other and a cam edge opposite the mounting edges, screw means for removably attaching said step-back cam to said frame, and location means cooperating with said two mounting edges for locating the step-back cam edge on the frame.

9. An apparatus as set forth in claim 8, wherein said step-back cam edge comprises at least two surfaces having a different degree of slope, one of said surfaces being effective to position the heel of the working face of the bonding tool away from the wire being bonded at a first bond, and the other surface being effective to position the working face of the bonding tool substantially parallel to the wire being bonded at a last bond.

10. An apparatus for moving and positioning a bonding tool relative to a semiconductor device to place a predetermined loop pattern in the wire being bonded, comprising:

- a support frame;
- a step-back cam plate fixed on said frame for horizontally positioning the bonding tool;
- a carrier assembly slidably guided on said frame;
- a step-back cam follower on said carrier assembly;
- a bonding tool holder pivotally mounted on said carrier assembly;
- a bonding tool mounted in the free end of the bonding tool;
- a drop arm supportably engaging the free end of the bonding tool holder to position the height of the bonding tool; and
- a plurality of cams rotationally driven by a step-type drive motor operably engaging the carrier assembly and bonding tool holder for simultaneously positioning the height and horizontal position of the bonding tool at a first bond, and subsequent thereto for simultaneously moving the bonding tool upwardly and rearwardly to place a predetermined and adjustable loop pattern in the wire.